United States Patent
Kim et al.

(10) Patent No.: US 12,091,107 B2
(45) Date of Patent: Sep. 17, 2024

(54) MOTOR CONTROL DEVICE AND METHOD

(71) Applicant: HL Mando Corporation, Pyeongtaek-si (KR)

(72) Inventors: Hyun Jung Kim, Seongnam-si (KR); Young Beom Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 357 days.

(21) Appl. No.: 17/679,581

(22) Filed: Feb. 24, 2022

(65) Prior Publication Data
US 2022/0266896 A1 Aug. 25, 2022

(30) Foreign Application Priority Data
Feb. 24, 2021 (KR) .................. 10-2021-0024494

(51) Int. Cl.
*B62D 5/04* (2006.01)

(52) U.S. Cl.
CPC ......... *B62D 5/0484* (2013.01); *B62D 5/0493* (2013.01)

(58) Field of Classification Search
CPC .. B62D 5/0484; B62D 5/0493; B62D 5/0463; H02P 6/08; H02P 29/028
See application file for complete search history.

(56) References Cited

U.S. PATENT DOCUMENTS

| | | | |
|---|---|---|---|
| 2017/0033726 A1* | 2/2017 | Yamamoto | H02P 29/028 |
| 2019/0111964 A1* | 4/2019 | Kim | B62D 5/0463 |
| 2019/0118856 A1* | 4/2019 | Won | B62D 5/049 |
| 2019/0334466 A1* | 10/2019 | Arai | H02P 25/22 |
| 2019/0344800 A1* | 11/2019 | Kim | B62D 5/081 |

OTHER PUBLICATIONS

KR 20190131684 A with English translation; published Nov. 27, 2019. (Year: 2019).*
D. Kim, J. Lee, M. Y. Yang, H. Y. Bhae and J. W. Jeon, "A Study on Applicable Control Methods of Electric Power Steering System in Dynamic Redundancy Environments," 2018 18th International Conference on Control, Automation and Systems (ICCAS), PyeongChang, Korea (South), 2018, pp. 1556-1561. (Year: 2018).*

* cited by examiner

*Primary Examiner* — Calvin Cheung
(74) *Attorney, Agent, or Firm* — Hauptman Ham, LLP (57) ABSTRACT

The embodiments of the present disclosure relate to a motor control device and method, more particularly, a motor control device and method capable of improving an uncomfortable feeling in motor control by minimizing the control stop time by classifying the operation in the transition period of a control right to another motor control device according to a failure type, in the case of a failure of the motor control device having the control right in the motor control system of the redundancy structure.

11 Claims, 10 Drawing Sheets

| Fault module category | |
|---|---|
| 1st Failure Mode | · T/S1, 2<br>· C/L1<br>· Battery1 (Open, Short) |
| 2nd Failure Mode | · MPS1<br>· Gate driver1<br>· Motor<br>· Motor current |

MOTOR CONTROL DEVICE AND METHOD

CROSS REFERENCE TO RELATED APPLICATION

This application claims priority from Korean Patent Application No. 10-2021-0024494, filed on Feb. 24, 2021, which is hereby incorporated by reference for all purposes as if fully set forth herein.

TECHNICAL FIELD

Embodiments of the present disclosure relate to a motor control device and method.

BACKGROUND

A vehicle steering system refers to a system capable of changing a steering angle of a wheel based on a steering force (or rotational force) applied to a steering wheel by a driver of the vehicle. Recently, an electric power steering system (EPS) has been applied to a vehicle in order to reduce the steering force of the steering wheel to ensure the stability of the steering state. Accordingly, in addition to the demand for improving the performance of a motor provided in the steering system of the vehicle, there is increasing the importance of the motor control technology of the redundancy structure in preparation for the failure of a main control device. In such a motor control device having a redundancy structure, there is a problem in that there may occurs an uncomfortable feeling such as discontinuity of control in the process of transferring a control right to a sub-control device in response to a failure of a main control device.

SUMMARY

Embodiments of the present disclosure provide a motor control device and method capable of improving an uncomfortable feeling of control in the event of a failure.

In an aspect of the present disclosure, the present embodiments may provide a motor control device including a controller configured to generate target torque information for a motor control based on information received from a vehicle sensor and control a motor based on the target torque information, a failure determiner configured to determine whether a failure has occurred in a motor control operation for the motor, and determine a failure type in response to an occurrence of a failure, and a transmission determiner configured to, in response to the occurrence of a failure, stop the motor control operation, and determine whether to transmit the target torque information to another motor control device based on the failure type.

In another aspect of the present disclosure, the present embodiments may provide a motor control method including generating target torque information for a motor control based on information received from a vehicle sensor and controlling a motor based on the target torque information, determining whether of an occurrence of a failure, and determining a failure type in response to the occurrence of the failure, and stopping a control operation of the motor in response to the occurrence of the failure, and determining whether to transmit the target torque information to another motor control device based on the failure type.

According to embodiments of the present disclosure, it is possible to provide a motor control device and method capable of improving an uncomfortable feeling of control in the event of a failure.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described terms used in a motor control device and method according to an embodiment of the present disclosure.

Transition in the present specification may refer to an operation of transferring control right of a main motor control device to an auxiliary motor control device when a failure of the main motor control device occurs in a motor control system having a redundancy structure. Alternatively, the transition may refer to an operation of transferring control right to another motor control device when a failure occurs in a motor control device having a control right among a plurality of motor control devices which simultaneously drive a motor. That is, the transition may refer to an operation of changing the control right of the motor control device to safely maintain the function (i.e. a fail-operational function) even if a failure occurs.

In addition, in the present disclosure, a motor control device is an electronic control device for controlling a motor, and may mean an ECU (Electronic Control Unit), and the electronic control device may be a concept including a motor control unit (MCU) and an inverter.

Further, the motor in the present disclosure may be a double winding motor. In addition, the motor may be designed to be separated into a motor 1 and a motor 2 by insulating the windings of the motor, so that a driving control can be performed by each motor control device. In addition, in this disclosure, 'failure' and 'fault' may be defined as terms having the same meaning.

Figure 1:
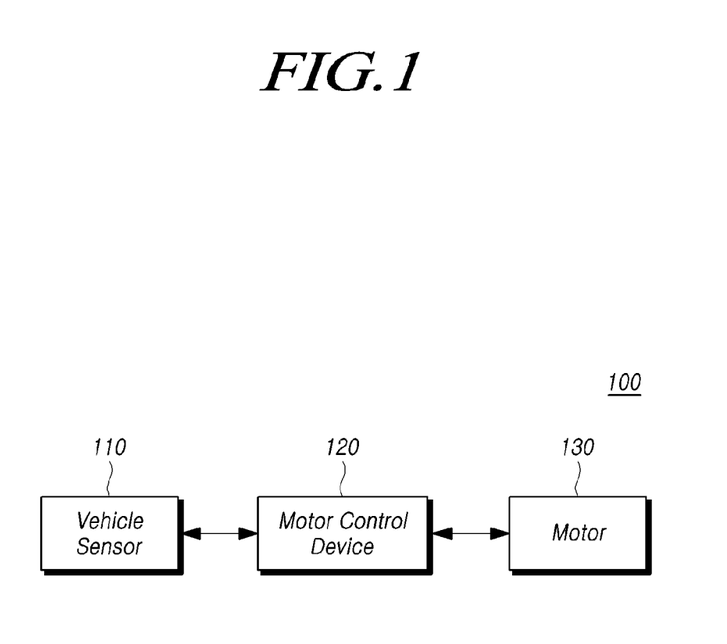
FIG. 1 illustrates a configuration of a motor control system for a vehicle according to an embodiment of the present disclosure.

FIG. 1 illustrates a configuration of a motor control system for a vehicle according to an embodiment of the present disclosure.

Referring to FIG. 1, a motor control system 100 of a vehicle according to an embodiment of the present disclosure may include a vehicle sensor 110, a motor control device 120, and a motor 130. For example, the vehicle sensor 110 refers to an integrated sensor mounted on a vehicle, which detects vehicle information, and transmits the detected vehicle information to the motor control device 120 to drive a motor.

The vehicle sensor 110 may mean a sensor which generates all vehicle information for identifying a state of the vehicle, such as the vehicle speed, temperature, and steering angle. For example, the vehicle sensor 110 may be a vehicle speed sensor, a steering angle sensor, a yaw rate sensor, a gyro sensor, a temperature sensor, a radar sensor, a lidar sensor, or the like. For example, each of the vehicle sensors 110 may be provided to detect vehicle information, or a plurality of vehicle sensors may be provided to detect the same vehicle information. As another example, in a steering system, the vehicle sensor 110 may include a first steering angle sensor and a second steering angle sensor, each of which may detect a steering angle input from the driver through the steering wheel, and may transmit the detected steering angle information to the motor control device 120.

The motor control device 120 may control a motor installed in the vehicle. For example, the motor control device 120 may control the motor by generating a motor control command for controlling the motor 130 installed in the vehicle based on vehicle information received from the vehicle sensor 110. In addition, the motor control device 120 may have a redundancy structure including a plurality of control devices. For example, the motor control device 120 may include a first motor control device 330 for controlling the motor, and a second motor control device 340 for controlling the motor if it is impossible to control the motor by the first motor control device 330. Hereinafter, it will be described a detailed description of the motor control device 120 with reference to FIGS. 2 to 9.

The motor 130 may drive the vehicle. Specifically, the motor 130 may be driven according to a motor control command generated by the motor control device 120. For example, the motor 130 may be a steering motor. Specifically, the motor 130 may be driven to generate a rotational force according to a motor control command generated by the motor control device 120 based on a torque value input from the driver. In the present disclosure, the motor control device 120 is described as a case in which the motor is a steering motor, but as described above, it may be similarly applied to a case of controlling a motor having another function.

Figure 2:
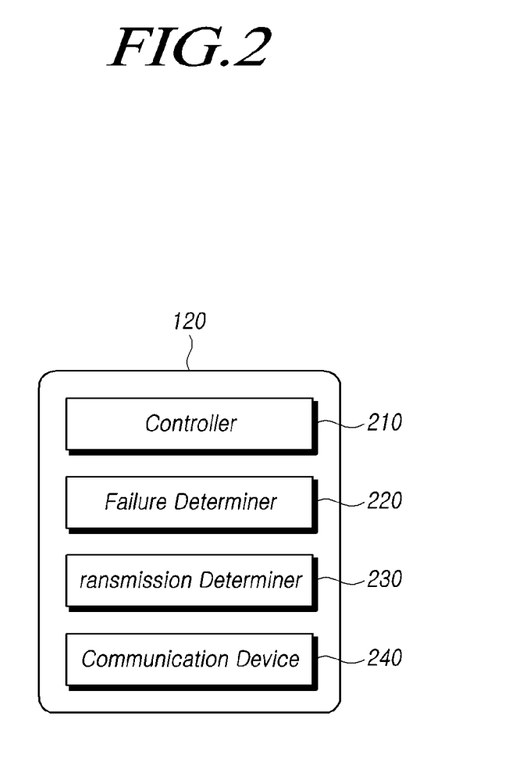
FIG. 2 illustrates a configuration of a motor control device according to an embodiment of the present disclosure.

FIG. 2 illustrates a configuration of a motor control device according to an embodiment of the present disclosure.

Referring to FIG. 2, a motor control device 120 according to an embodiment of the present disclosure may include a controller 210 for generating target torque information for a motor control based on information received from a vehicle sensor and controlling a motor based on the target torque information, a failure determiner 220 for determining whether of an occurrence of a failure in a motor control operation for the motor and determining a failure type in response to an occurrence of a failure, and a transmission determiner 230 for, in response to the occurrence of a failure, stopping the motor control operation and determining whether to transmit the target torque information to another motor control device based on the failure type.

For example, in a motor control device having a redundancy structure, another motor control device may receive target torque information from the motor control device 120 to control the motor. However, if the target torque information is not received due to a failure of the motor control device 120, the other motor control device may directly generate target torque information based on the information received from the vehicle sensor 110 to control the motor 130.

For example, another motor control device may generate the same target torque information as the target torque information generated by the controller 210 of the motor control device 120. Accordingly, in the case that the vehicle is normally controlled, since vehicle information received by the motor control device 120 and another motor control devices is the same, there may be generated the same target torque information for performing the same control.

As another example, the motor control device 120 may further include a communication device 240 for exchanging at least one of target torque information, state information and failure information of each motor control device with another motor control device. The communication device 240 may mean a communication means for exchanging data between the motor control device 120 and another motor control device, and may mean all communication methods such as a CAN communication method (e.g., vehicle CAN, private CAN).

For example, the controller 210 may receive vehicle information from the vehicle sensor 110 to generate a motor control command for driving a motor of the vehicle. For example, the controller 210 may receive vehicle information from the vehicle sensor 110. Specifically, the received vehicle information may mean any information for identifying the state of the vehicle, such as torque information, steering angle information, and motor position information, and the generated motor control command may include at least one of target torque information, target position information, and target speed information for motor control. Therefore, in the present disclosure, the target torque information generated by the controller 210 may be an example of a motor control command, however, is not limited thereto, and may include various information for driving a motor of a vehicle.

For example, the controller 210 may generate a motor control command, and an inverter may output a driving current of the motor by receiving the motor control command as an input. In addition, the controller 210 may receive a motor control command generated by another motor control device according to a determination of the transmission determiner 230 and operate the inverter to drive the motor.

As another example, if a failure of the motor control device 120 occurs, the controller 210 may block an operation of the corresponding component to stop an operation of the motor. In addition, the controller 210 may stop generating the motor control command in addition to the stop of the operation of the motor.

For example, the failure determiner 220 may determine the failure type by classifying into a first failure mode or a second failure mode based on a preset table. In this case, the first failure mode and the second failure mode may be classified according to whether target torque information can be generated according to occurrence of a failure. For example, the failure determiner 220 may determine whether of the occurrence of a failure by monitoring an operation of the controller 210 of the motor control device 210. In addition, the failure determiner 220 may determine whether another motor control device has a failure based on information exchanged with another motor control device through the communication device 240.

As another example, if a failure of the motor control device 120 is determined to be the first failure mode, the transmission determiner 230 may determine to stop transmission of the target torque information to another motor control device. in addition, if a failure of the motor control device 120 is determined to be the second failure mode, the transmission determiner 230 may determine to transmit the target torque information to another motor control device.

Figure 3:
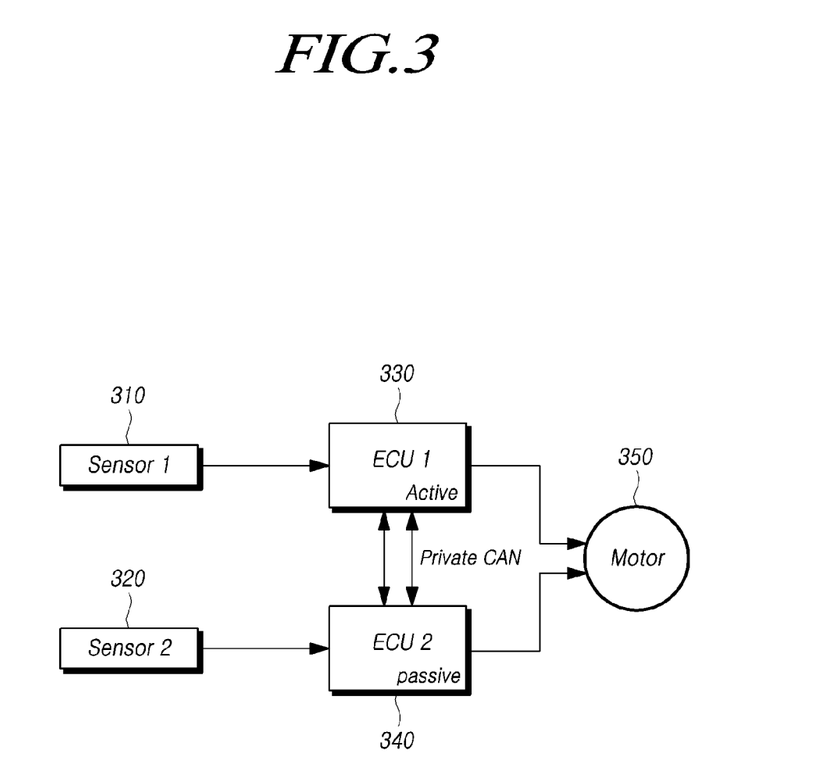
FIG. 3 is a diagram for explaining an operation of the motor control system of a redundancy structure according to an embodiment of the present disclosure.

FIG. 3 is a diagram for explaining an operation of the motor control system of a redundancy structure according to an embodiment of the present disclosure.

It will be described an example of controlling a motor during a normal operation of a motor control system having a redundancy structure with reference to FIG. 3. The motor control device in the present disclosure will be described as an electronic control unit (ECU) as an example.

An input of an ECU1 330 may be connected to an output terminal of Sensor1 310, and an output of the ECU1 330 may be connected to an input terminal of a motor 330. Also, an input of an ECU2 340 may be connected to an output terminal of Sensor2 320, and an output of the ECU2 340 may be connected to an input terminal of motor 330. In this case, the motor control system may be configured to have a redundancy structure in which the outputs of the ECU1 330 and the ECU2 340 are simultaneously connected to the input terminal of the motor 330 to control a fail-safe operation. For example, the motor control system having a redundancy structure may use ECU1 330 as a main motor control device and ECU2 340 as an auxiliary motor control device or a sub motor control device. In this case, the motor control is performed by ECU1 330 during normal operation, and when a failure occurs, it may be performed a transition of a control right to the ECU2 340, and the ECU 340 may control the motor 350. Conversely, a motor control system having a redundancy structure may use ECU2 340 as a main motor control device and ECU1 330 as an auxiliary motor control device. In this case, the motor control is performed by ECU2 340 during normal operation, and when a failure occurs, it may be performed a transition of a control right to the ECU1 330, and the ECU1 330 may control the motor 350. For another example, a motor control system having a redundancy structure capable of controlling the motor without stopping even if a sensor failure occurs by designing a redundant sensor as well as the ECU. As another example, a motor control system having a redundancy structure may be used as a device which generates 100% of final output with 50% of ECU1 330 output and 50% of ECU2 340 output. In this case, ECU1 330 may be a motor control device (i.e., an active device) having a control right. Accordingly, if the motor control system operates normally, ECU1 330 having the control right may receive a signal from a sensor, generate a control command including target torque information corresponding thereto, and transmit the generated control command to ECU2 340 to control the motor based on this. Conversely, ECU2 340 may be a motor control device (i.e., an active device) having a control right.

Figure 4:
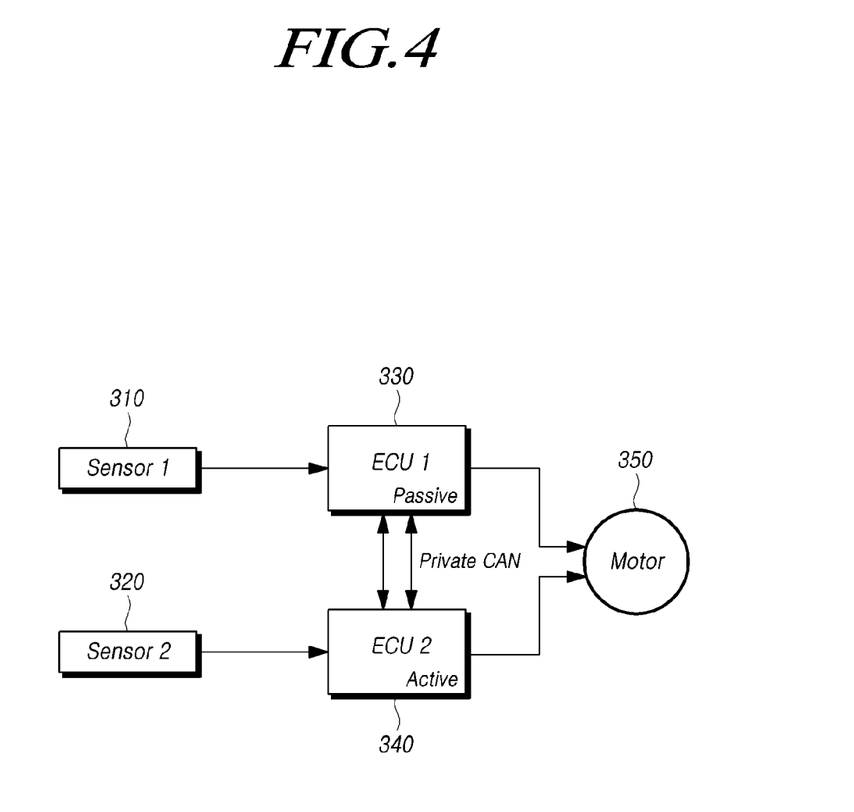
FIG. 4 is a diagram for explaining an operation of a motor control system having a redundancy structure according to another embodiment of the present disclosure.

FIG. 4 is a diagram for explaining an operation of a motor control system having a redundancy structure according to another embodiment of the present disclosure.

It will be described an example of controlling a motor when a failure occurs in a motor control system having a redundancy structure with reference to FIG. 4.

For example, in a motor control system having a redundancy structure, ECU1 330 may be used as a main motor control device, and ECU2 340 may be configured to be used as an auxiliary motor control device or a sub motor control device. In this case, if a failure of ECU1 330 occurs, the motor control system may block a motor control operation by ECU1 330, and may control the motor 350 by the ECU2 340 by transitioning the control right to the ECU2 340. However, the control of the motor 350 may be stopped in a period in which a transition operation is performed.

As another example, in a motor control system having a redundancy structure, ECU1 330 and ECU2 340 may be configured to be used together as a motor control device. In this case, if it is determined that the ECU1 330 having the control right has a failure, the motor control system may block the control of the motor 350 by the ECU1 330 and continues the control of the motor 350 by the ECU2 340. However, there may occur a period in which the control right transitions from ECU1 330 to ECU2 340, and motor control may be stopped in this period.

Accordingly, in one embodiment, if a transition period in which motor control is stopped occurs, ECU2 340 may maintain the driving control of the motor 350 by receiving a control command including target torque information generated by ECU1 330 based on a failure type of ECU1 330 having the control right and whether control command generation is possible. Alternatively, the driving of the motor 350 may be stopped until the ECU2 340 generates a control command including the target torque information based on the received sensing information to control the driving of the motor 350. The failure type and an operation therefor will be described later in more detail with reference to FIGS. 5 and 7.

Figure 5:
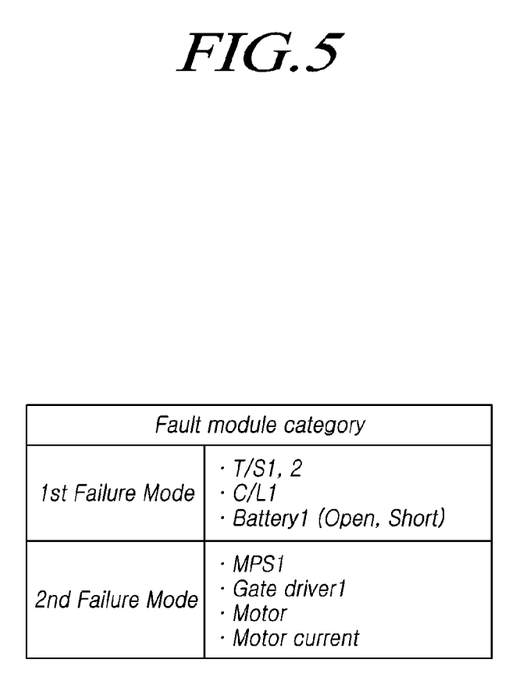
FIG. 5 illustrates an example of a pre-stored failure type according to an embodiment of the present disclosure.

FIG. 5 illustrates an example of a pre-stored failure type according to an embodiment of the present disclosure.

Referring to FIG. 5, there is illustrated an example of the failure type stored after being classified into a first failure mode or a second failure mode according to the occurrence of a failure. The failure determiner 220 according to an embodiment of the present disclosure may determine the failure type by classify the failure type into a first failure mode or a second failure mode based on a preset table. Accordingly, in the motor control device 120, the failure determiner 220 can quickly determine whether of the occurrence of a failure by simply comparing with a pre-stored failure type table without using a separate complex algorithm for classifying the failure types.

The failure determiner 220 according to another embodiment of the present disclosure may classify the failure type into a first failure mode or a second failure mode according to a fault module category of the motor control device 120. Alternatively, the failure determiner 220 may classify the first failure mode or the second failure mode according to whether the motor control device 120 can generate a control command including the target torque information.

Specifically, for example, if it is determined that a failure has occurred in the motor control device 120 and it is impossible for the motor control device 120 to generate a control command including the target torque information, the failure determiner 220 may determine to be in the first failure mode. For example, if it is determined that the reason of the failure is a case in which a signal for control is not received due to a failure of a torque sensor 1 (ex, T/S 1) or the a torque sensor 2 (ex, T/S 2), the failure determiner 220 may determine as the first failure mode. Alternatively, if it is determined that the failure reason is a case in which an output signal for control cannot be generated due to a failure of the control logic (e.g., C/L), the failure determiner 220 may determine as the first failure mode. Alternatively, if it is determined that the failure reason is an open or short failure of a battery, the failure determiner 220 may determine as the first failure mode.

In another example, if it is determined that a failure has occurred in the motor control device 120, but it is determined that it is possible for the motor control device 120 to generate a control command including the target torque information, the failure determiner 220 may determine as the second failure mode. For example, if it is determined that the cause of the failure is a case in which the rotational position of a rotor cannot be measured due to the failure of a motor position sensor, the failure determiner 220 may determine to the second failure mode. Alternatively, if it is determined that the cause of the failure is the case in which an inverter input current cannot be measured due to the failure of a motor current sensor, the failure determiner 220 may determine as the second failure mode. Alternatively, if it is determined as the failure of the motor or the failure of the gate driver for applying a signal to the inverter, the failure determiner 220 may determine the second failure mode. However, the above failure types are exemplary, and the present disclosure is not limited thereto.

Figure 6:
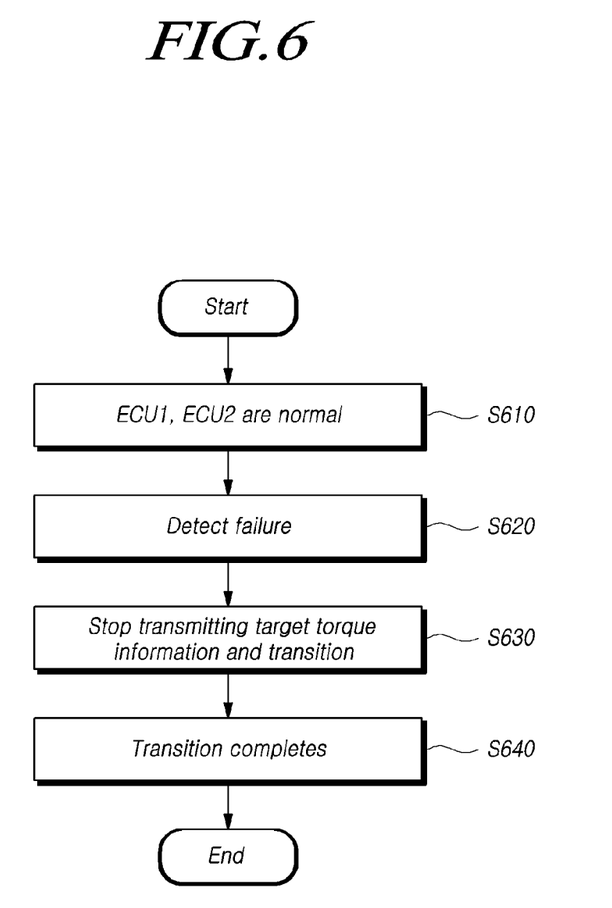
FIG. 6 is a flowchart for explaining the operation of the motor control device in the case of an occurrence of a failure according to an embodiment of the present disclosure.

FIG. 6 is a flowchart for explaining the operation of the motor control device in the case of an occurrence of a failure according to an embodiment of the present disclosure.

Referring to FIG. 6, it will be described an example of an operation of a motor control device when a failure occurs in a motor control system having a redundancy structure.

The motor control system 100 of the redundancy structure may include ECU1 330 and ECU2 340 operating normally (S610). For example, in a motor control system having a redundancy structure, during normal operation, ECU1 330 may be used as a main motor control device and ECU2 340 may be used as an auxiliary motor control device or a sub motor control device, and the motor control may be performed by the main electronic control unit. Alternatively, the motor control system having the redundancy structure may use 50% of the ECU1 330 output and 50% of the ECU2 340 output together during normal operation.

The motor control device 120 may detect a failure (S620). For example, the motor control device 120 may detect that a failure has occurred in the motor control operation based on information received from vehicle sensors. Alternatively, the motor control device 120 may monitor the operation of the controller 210 and detect that a failure has occurred based on the monitoring result. Alternatively, the motor control device 120 may detect that a fault has occurred in the motor control operation by exchanging failure information (e.g., ECU status flag, error flag) through communication (ex, CAN) between the motor control devices 120.

If it is determined that a failure has occurred, the motor control device 120 may stop the motor control operation and transition a control right to another motor control device (S630). For example, if a failure occurs in ECU1 330 used as the main motor control device, the motor can no longer be controlled by ECU1 330 as the main electronic control device. Accordingly, the main motor control device for controlling the driving of the motor is changed from ECU1 330 to ECU2 340, and motor control by ECU2 340 may be performed. For another example, in the case that ECU1 330 and ECU2 340 control a motor together, if a failure occurs in ECU1 330 having control right, the ECU1 330 can no longer transmit a control command including the generated target torque information to the ECU2 340, which is another motor control device. In addition, the control right for controlling the driving of the motor is changed from ECU1 330 to ECU2 340, and ECU2 340 may generate a motor control command.

If the control right is changed from ECU1 330 to ECU2 340, a transition operation may be completed (S640). However, for example, since the control is stopped until the ECU2 340 receives the control right and performs control, that is, in a transition period, there may occur an uncomfortable feeling.

Figure 7:
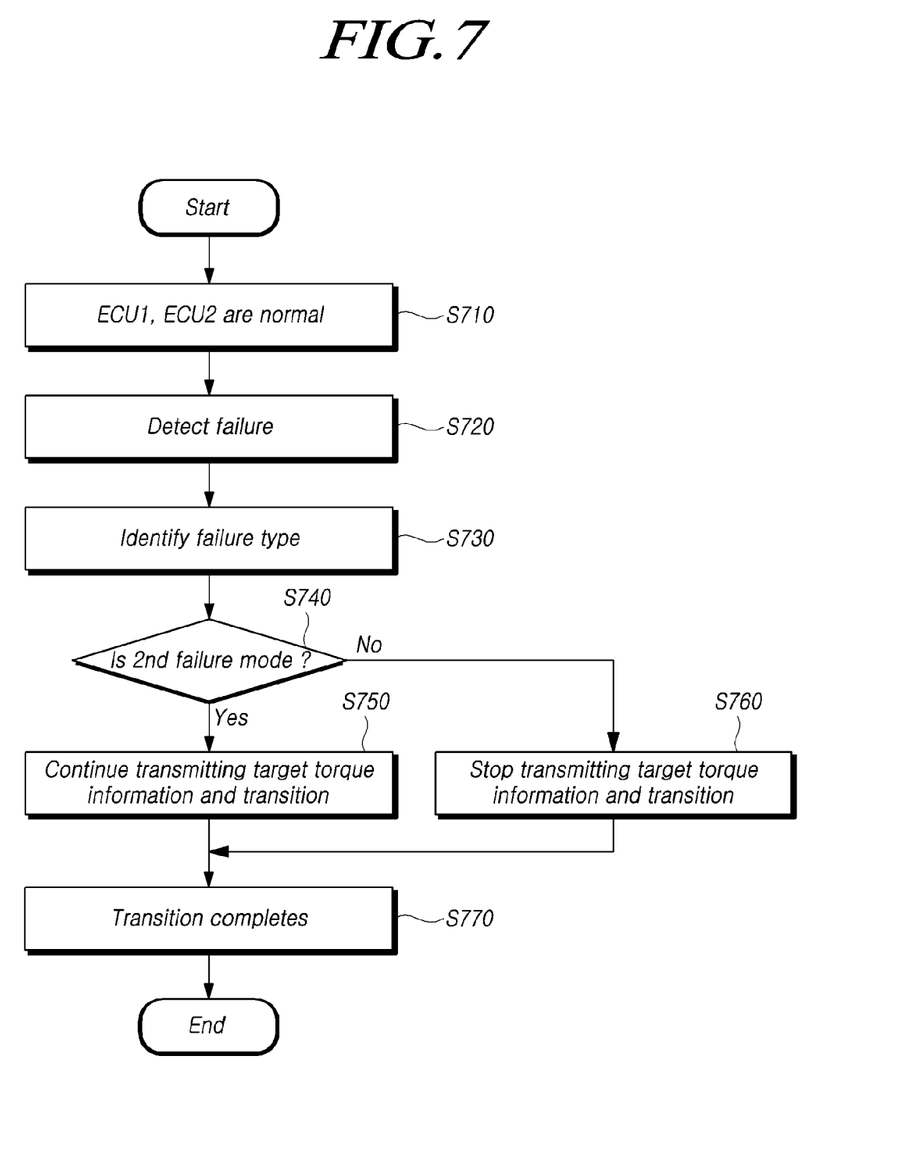
FIG. 7 is a flowchart for explaining the operation of the motor control device in the case of an occurrence of a failure according to another embodiment of the present disclosure.

FIG. 7 is a flowchart for explaining the operation of the motor control device in the case of an occurrence of a failure according to another embodiment of the present disclosure.

It will be described an example of controlling a motor through operation classification in response to an occurrence of a failure in a motor control system having a redundancy structure with reference to FIG. 7. During normal operation of the motor control system 100 having the redundancy structure, a plurality of motor control devices 120 may be configured (S710), and each motor control device 120 may detect a failure (S720). The details are the same as described above with reference to FIG. 6.

The failure determiner 220 of the motor control device 120 may determine whether of the occurrence of a failure and a failure type (S730). For example, if the motor control device or another motor control device generates its own failure information (ex, fault signal), the failure determiner 220 may determine whether of the occurrence of a failure and the type of failure based on the generated failure information.

The failure determiner 220 of the motor control device 120 may determine the failure type by classifying into a first failure mode or a second failure mode based on a preset table (S740). Details of the condition for classifying failure modes are the same as described above with reference to FIG. 5.

If the failure determiner 220 of the motor control device 120 determines that the failure of the motor control device 120 occurs and the failure type corresponds to the second failure mode, the transmission determiner 230 may determine to continue transmitting the target torque information to another motor control device (S750). For example, another motor control device may be controlled to drive the motor by receiving the target torque information generated by the motor control device 120 even in a period in which the control right of the motor control device 120 is transitioned to another motor control device. Therefore, the motor control device 120 may minimize the control stop time occurring in the control right transition period only when the failure type corresponds to the second failure mode.

Meanwhile, if the failure determiner 220 of the motor control device 120 determines that the failure of the motor control device 120 occurs and the failure type corresponds to the first failure mode, the transmission determiner 230 may determine to stop transmitting the target torque information to another motor control device (S760). For example, the motor control device 120 and other motor control devices cannot control the driving of the motor in a period in which the control right of the motor control device 120 is transitioned to another motor control device. Accordingly, if the failure type corresponds to the first failure mode, the motor control device 120 has no choice but to maintain the control stop time occurring in the control right transition period as before.

When another motor control device receives the control right of the motor control device 120 and starts control, the transition operation is completed (S770). For example, when the transition is complete, another motor control device may be used as a main motor control device to control to output 100% of the motor, or to take over the control right and generate a motor control command to output of 50% of the motor.

Figure 8:
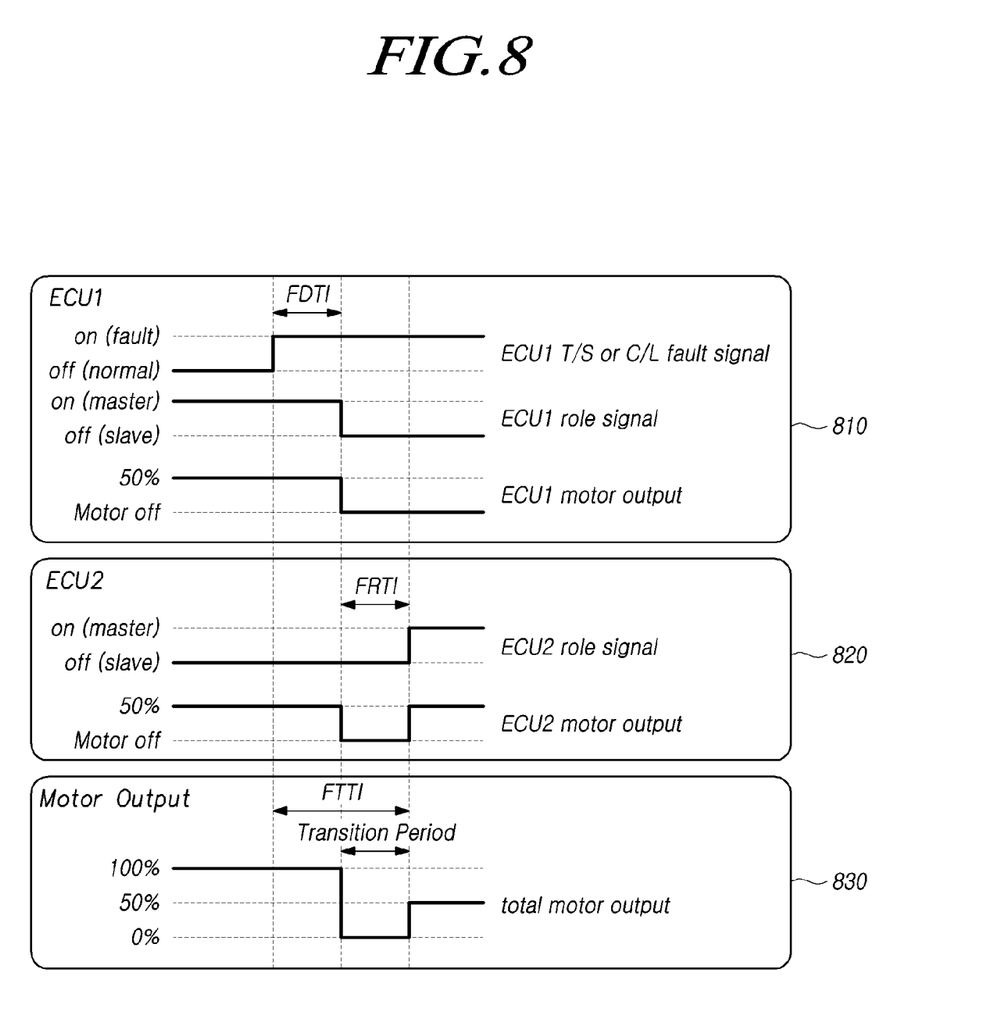
FIG. 8 is a diagram for explaining an operation of a motor control device according to an embodiment of the present disclosure.

FIG. 8 is a diagram for explaining an operation of a motor control device according to an embodiment of the present disclosure.

Referring to FIG. 8, it will be described an example of the operation of the motor control device when the above-described first failure mode occurs in a motor control system having a redundancy structure. In addition, a fault detection time interval (FDRI), which is a term related to a fault signal in FIGS. 8 and 9, may mean a time from the occurrence of a failure to failure detection, a fault reaction time interval (FRTI) may mean a time from failure detection to normal state entry, and a fault tolerant time interval (FTTI) may mean the minimum time from the occurrence of a failure to the normal state entry.

As an example, in the operation signal 810 of ECU1 as shown, a C/L fault signal may be input when a failure of a torque sensor connected to an input of ECU1 occurs or a failure of control logic of ECU 1 occurs. Alternatively, a role signal of ECU1 may be changed from ON (master) to OFF (slave) when a failure is detected after FDTI elapses after a fault signal is input. This is because a control right of ECU1 is lost due to a failure of ECU1. The output of the driving motor by ECU1 can be changed from 50% as before to 0% at a time when a failure is detected after FDTI elapses after a fault signal is input.

In the operation signal 820 of ECU2 as shown as an example, a role signal of ECU2 may be changed from OFF (slave) to ON (master) if FRTI elapses after a time when the role signal of ECU1 is changed from ON (master) to OFF (slave), in contrast to ECU1. Alternatively, control may be stopped during a control right is transferred to ECU2 due to a failure of ECU1 having control right. Therefore, the drive motor output by ECU2 may be changed from 50% to 0% when the role signal of ECU1 is changed from ON (master) to OFF (slave), and may be changed from 0% to 50% again at a time when the control right transition is completed, that is, when the role signal of ECU2 is changed from OFF (slave) to ON (master).

In an output signal 830 of the motor output as shown as an example, the output signal of the motor output may be changed from 100% as before to 0% at a time when the role signal of ECU1 is changed from ON (master) to OFF (slave), and may be changed from 0% to 50% at a time when the control right transition between ECU1 and ECU2 is completed and the role signal of ECU2 is changed from OFF (slave) to ON (master). Therefore, in the control right transition period in which control is stopped, the output signal of the motor output may be 0%. In FIG. 8, the T/S or C/L fault signal has been described as an example, but as described above, there may be similarly applied in the case that the failure of the motor control device is classified as the first failure mode.

Figure 9:
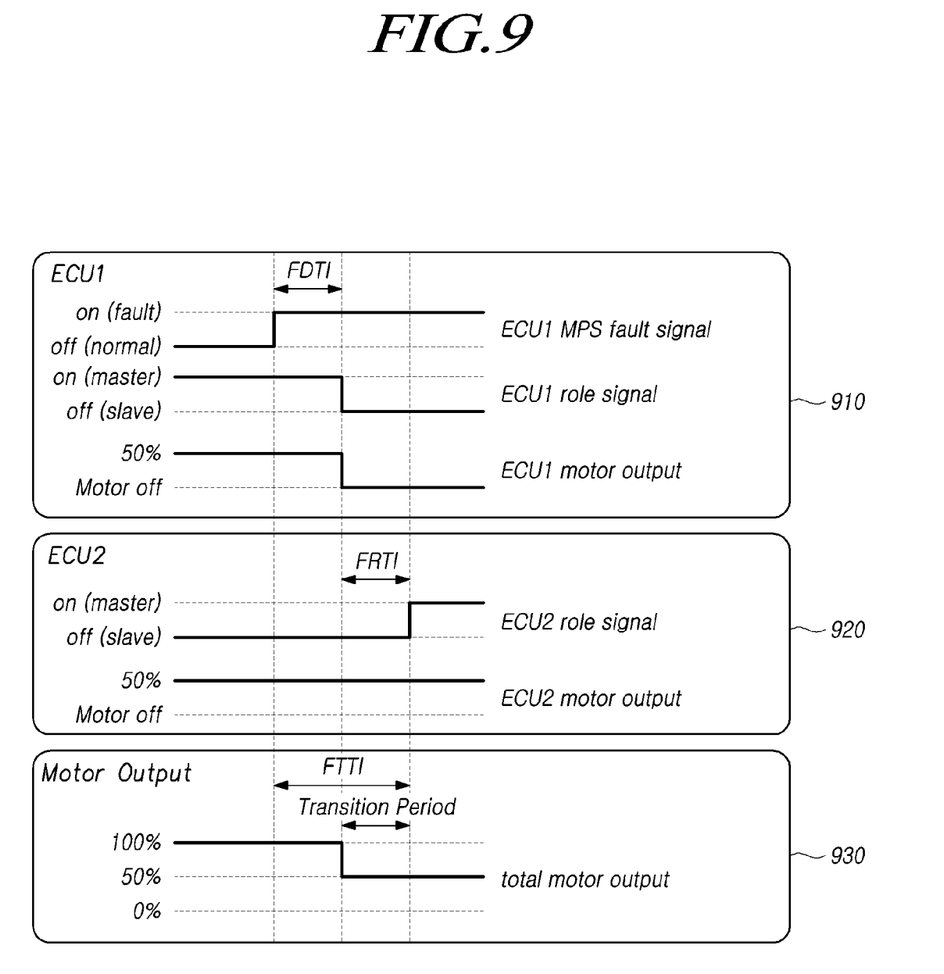
FIG. 9 is a diagram for explaining an operation of a motor control device according to another embodiment of the present disclosure.

FIG. 9 is a diagram for explaining an operation of a motor control device according to another embodiment of the present disclosure.

It will be described an example of the operation of the motor control device when the above-described second failure mode occurs in a motor control system having a redundancy structure with reference to FIG. 9.

In an operation signal 910 of ECU1 as shown as an example, a MPS fault signal may be input when a failure of the motor position sensor occurs. A role signal of ECU1 may be changed from ON (master) to OFF (slave) when a failure is detected after FDTI elapses after the fault signal is input. This is because the control right of ECU1 is lost due to a failure of ECU1. Alternatively, the output of the driving motor by ECU1 may be changed from 50% to 0% when a failure is detected after FDTI elapses after a fault signal is input.

In an operation signal 920 of ECU2 as shown as an example, the role signal of ECU2 may be changed from OFF (slave) to ON (master) at a time when the FRTI elapses after the role signal of ECU1 is changed from ON (master) to OFF (slave), in contrast to ECU1. However, unlike the role signal of ECU2, the output of the driving motor by ECU2 can be maintained at 50%. Alternatively, when the control right is transferred to ECU2 due to a failure of ECU1 having the control right, if the MCU included in ECU1 operates normally, there may not occur the control stop of the motor control system. Alternatively, if the MCU included in ECU1 operates normally, ECU2 may be controlled to drive the motor based on the target torque information generated in ECU1 even in the control right transition period.

For example, in an output signal 930 of the motor output as shown, the output signal of the motor output is changed from 100% as before to 50% at a time when the role signal of ECU1 is changed from ON (master) to OFF (slave), however, may be maintained at 50% even in the control right transition period between ECU1 and ECU2. Accordingly, the time for which the control stop occurs can be minimized in the control right transition period. Although the MPS fault signal has been described in FIG. 9 as an example, as described above, there may be similarly applied when the failure of the motor control device is classified as the second failure mode.

Hereinafter, it will be described a motor control method which can be performed by the motor control device 120 described with reference to FIGS. 1 to 9.

Figure 10:
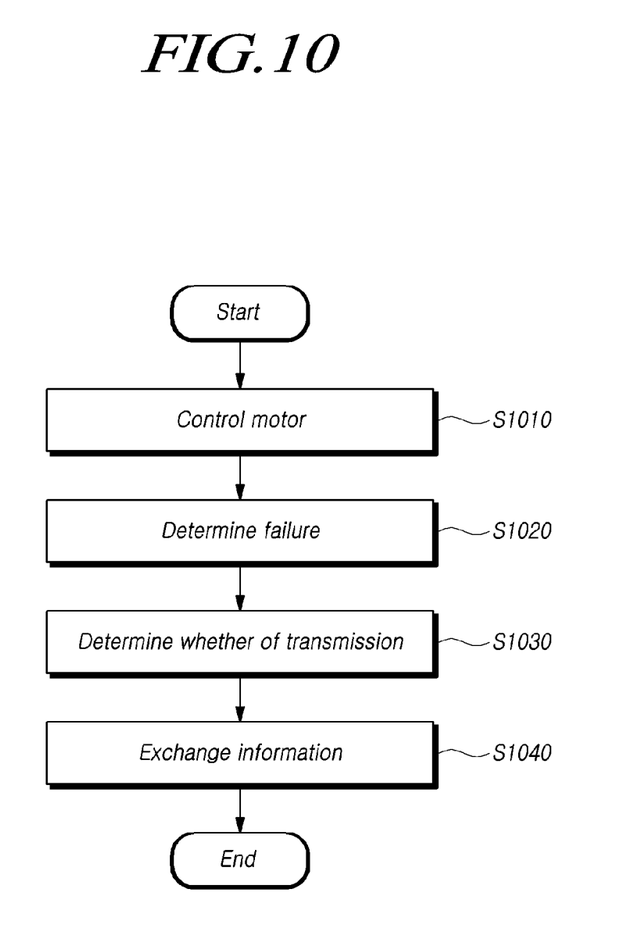
FIG. 10 is a flowchart of a motor control method according to an embodiment of the present disclosure.

FIG. 10 is a flowchart of a motor control method according to an embodiment of the present disclosure.

Referring to FIG. 10, the motor control method of the present disclosure may include controlling the motor (S1010). For example, a target torque for motor control may be generated based on information received from a vehicle sensor, and the motor may be controlled to generate the target torque.

In addition, the motor control method may include determining a failure of the motor control device (S1020). For example, it is possible to determine whether a failure has occurred, and to determine a failure type if a failure occurs.

In addition, the motor control method may include determining whether to transmit the target torque information by the motor control device (S1030). For example, in response to an occurrence of a failure, the motor control operation may be stopped, and there may be determined whether to transmit the target torque information to another motor control device based on the failure type.

In addition, the motor control method may include a communication step in which the motor control device exchanges information with another motor control device (S1040). For example, the motor control device may exchange at least one of target torque information, state information and failure information of each motor control device with the other motor control device.

In an embodiment, the step S1010 of controlling the motor may include receiving, by another motor control device, the target torque information from the motor control device to control the motor if a failure does not occur. On the other hand, when a failure occurs, if target torque information is not received from the motor control device, another motor control device may control the motor by generating target torque information based on the information received from the vehicle sensor.

In another embodiment, the step S1020 of determining a failure may include determining the failure type by classifying into a first failure mode or a second failure mode based on a preset table. In this case, the first failure mode and the second failure mode may be classified according to whether the target torque information can be generated according to the occurrence of the failure.

In another embodiment, the step S1030 of determining whether to transmit may include determining to stop, if the failure of the motor control device is determined to be the first failure mode, transmission of the target torque information to another motor control device. Conversely, the step of determining whether to transmit S1030 may include, if the failure of the motor control device is determined to be the second failure mode, determining to transmit the target torque information to another motor control device.

The motor control device 120 and the controller 210, the failure determiner 220, the transmission determiner 230 and the communication device 240 included therein according to the present embodiment may be implemented as a module of a control device or an ECU of a motor control device mounted on a vehicle.

The motor control device or ECU may include a processor, a storage device such as a memory, and a computer program capable of performing a specific function. In addition, the controller 210, the failure determiner 220, the transmission determiner 230 and the communication device 240 may be implemented as software modules capable of performing respective corresponding functions.

That is, the controller 210, the failure determiner 220, the transmission determiner 230 and the communication device 240 according to the present embodiment may be implemented as respective software modules and stored in a memory, and each software module may be executed at a specific time point in an arithmetic processing unit such as an ECU.

As described above, according to a motor control device and method, it is possible to improve an uncomfortable feeling in motor control by minimizing the control stop time by classifying the operation in the transition period of a control right to another motor control device according to a failure type, in the case of a failure of the motor control device having the control right in the motor control system of the redundancy structure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A motor control device comprising:
    a controller configured to generate target torque information for a motor control based on information received from a vehicle sensor and control a motor based on the target torque information;
    a failure determiner configured to determine whether of an occurrence of a failure in a motor control operation for the motor, and determine a failure type in response to the occurrence of a failure; and
    a transmission determiner configured to, in response to the occurrence of a failure, stop the motor control operation, and determine whether to transmit the target torque information to another motor control device based on the failure type,
    wherein the another motor control device receives the target torque information from the motor control device and controls the motor if a failure does not occur, and
    wherein, in response to the occurrence of a failure, the another motor control device controls the motor by generating the target torque information based on information received from the vehicle sensor if the target torque information is not received from the motor control device.

2. The motor control device of claim 1, wherein the failure determiner determines the failure type by classifying into a first failure mode or a second failure mode based on a preset table, and
wherein the first failure mode and the second failure mode are classified according to whether the target torque information can be generated according to the occurrence of the failure.

3. The motor control device of claim 2, wherein the failure determiner determines as the first failure mode in the case that a generation of the target torque information is impossible in response to the occurrence of a failure, and
wherein the transmission determiner determines to stop transmitting the target torque information to another motor control device in response to determining that the failure of the motor control device is the first failure mode.

4. The motor control device of claim 2, wherein the failure determiner determines as the second failure mode in response to determining that a generation of the target torque information is possible, and
wherein the transmission determiner determines to transmit the target torque information to another motor control device in response to determining that the failure of the motor control device is the second failure mode.

5. The motor control device of claim 1, further comprising a communication device for exchanging at least one of the target torque information, state information, or failure information of the motor control devices with another motor control device.

6. A motor control method comprising:
generating target torque information for a motor control based on information received from a vehicle sensor and controlling a motor based on the target torque information;
determining whether of an occurrence of a failure, and determining a failure type in response to the occurrence of the failure; and
stopping a control operation of the motor in response to the occurrence of the failure, and determining whether to transmit the target torque information to another motor control device based on the failure type,
wherein the motor control method further comprises: by another motor control device, receiving the target torque information from the motor control device to control the motor if a failure does not occur, and controlling, in response to the occurrence of a failure, the motor by generating the target torque information based on information received from the vehicle sensor if the target torque information is not received from the motor control device.

7. The motor control method of claim 6, wherein the determining whether of an occurrence of a failure comprises determining the failure type by classifying into a first failure mode or a second failure mode based on a preset table, and
wherein the first failure mode and the second failure mode are classified according to whether the target torque information can be generated according to the occurrence of the failure.

8. The motor control method of claim 7, wherein the determining comprises determining as the first failure mode in the case that a generation of the target torque information is impossible in response to the occurrence of a failure, and
wherein the determining whether to transmit comprises determining to stop transmitting the target torque information to another motor control device in response to determining that the failure of the motor control device is the first failure mode.

9. The motor control method of claim 7, wherein the determining comprises determining as the second failure mode in the case that a generation of the target torque information is possible, and
wherein the determining whether to transmit comprises determining to transmit the target torque information to another motor control device in response to determining that the failure of the motor control device is the second failure mode.

10. The motor control method of claim 6, further comprising exchanging at least one of the target torque information, state information, or failure information of the motor control devices with another motor control device.

11. A motor control device comprising:
a controller configured to generate target torque information for a motor control based on information received from a vehicle sensor and control a motor based on the target torque information;
a failure determiner configured to determine whether of an occurrence of a failure in a motor control operation for the motor, and determine a failure type in response to the occurrence of a failure; and
a transmission determiner configured to, in response to the occurrence of a failure, stop the motor control operation, and determine whether to transmit the target torque information to another motor control device based on the failure type,
wherein the failure determiner determines the failure type by classifying into a first failure mode or a second failure mode based on a preset table, and
wherein the first failure mode and the second failure mode are classified according to whether the target torque information can be generated according to the occurrence of the failure.

* * * * *